United States Patent [19]

Simmons

[11] Patent Number: 5,574,255
[45] Date of Patent: Nov. 12, 1996

[54] LATERALLY EXPANDABLE MODULAR ELECTRICAL BOX

[76] Inventor: Micheal L. Simmons, 8561 Blackfoot Ct., Lorton, Va. 22079

[21] Appl. No.: 75,724

[22] Filed: Jun. 14, 1993

[51] Int. Cl.⁶ .................................................. H02G 3/08
[52] U.S. Cl. ........................................ 174/53; 220/3.92
[58] Field of Search ................ 174/53, 57; 220/3.92, 220/3.94

[56] References Cited

U.S. PATENT DOCUMENTS

| | | | |
|---|---|---|---|
| 933,661 | 9/1909 | Paiste | 220/3.92 |
| 948,438 | 2/1910 | Ziegler et al. | 220/3.92 |
| 1,230,218 | 6/1917 | Racquette | 220/3.94 |
| 1,483,453 | 2/1924 | Knoderer | 220/3.94 |
| 1,534,723 | 4/1925 | Lewis | 220/3.94 |
| 1,857,787 | 5/1932 | Meeks et al. | 220/3.94 |
| 2,959,633 | 11/1960 | Palmer et al. | |
| 3,622,029 | 11/1971 | Ware | |
| 4,057,164 | 11/1977 | Maier | 174/57 X |
| 4,111,328 | 9/1978 | Eggert et al. | |
| 4,263,472 | 4/1981 | Maheu | 174/57 X |
| 4,428,492 | 1/1984 | Jorgensen | 220/3.94 |
| 5,378,854 | 1/1995 | Hoover | 174/53 |

FOREIGN PATENT DOCUMENTS

| | | | |
|---|---|---|---|
| 2048506 | 2/1993 | Canada | 220/3.94 |
| 2033990 | 1/1972 | Germany | 220/3.94 |

*Primary Examiner*—Kristine L. Kincaid
*Assistant Examiner*—Paramita Ghosh
*Attorney, Agent, or Firm*—Laurence R. Brown

[57] ABSTRACT

There is no prior way to retrofit one or more laterally extending electrical boxes for extra switches, outlets or accessories such as rheostatic controls in existing walls without tearing out a portion of the wall, removing the box, rewiring a new ganged box and refinishing the wall. This invention provides modular lateral box extensions constructed to be installed from the open front end and supported by the installed box anchored to a beam with the wall being cut only enough to receive the extension modular box. This efficiently requires the wiring of only additional modules and avoids repair and repainting of walls.

1 Claim, 2 Drawing Sheets

LATERALLY EXPANDABLE MODULAR ELECTRICAL BOX

TECHNICAL FIELD

This invention relates to electrical boxes for installing switches, plugs and accessories flush with a wall surface, and more particularly it relates to laterally expandable modular electrical boxes and methods of mounting with less labor and mounting wall disfiguration.

BACKGROUND ART

In the electrical trades it is frequently required to expand an existing electrical box containing a plug or switch by mounting at the same location a two to four gang box for mounting additional switches, plugs or accessories such as rheostats. With the current commercially available electrical boxes, this is a costly and time consuming task. Thus single gang electrical boxes are anchored inside a mounting wall so that the open box front is flush with a mounting wall to receive a fitting and decorative cover. To expand the service at that location with addition of one or more boxes in a ganged mount, the wall must be broken away and disfigured to obtain access to the anchoring structure. Because present boxes are generally affixed to a stud behind the wall by nails or screws horizontally disposed, a significant section of the wall must be removed to be able to insert tools for removing the box and for remounting the new ganged box replacement. Also the resident box with fittings and wiring must be removed to make room for the new ganged box installation which requires the electrician to remove the wires and fittings and reconnect wiring in a new box. The wall then must be restored to receive the flush mounted ganged assembly with one to three additionally ganged boxes extending laterally from the initial box position after the ganged boxes are anchored in place and wired, including rewiring of the replaced initial box. After that the disfigured wall, often wallboard, will have to be repapered or repainted.

It is the object of this invention to improve the state of the art by introduction of a new electrical box configuration and accompanying method of replacing single gang electrical boxes with multiple gang boxes which considerably reduces cost, labor and disfigurement of walls.

Other objects, features and advantages of the invention will be found throughout the following description, claims and accompanying drawings.

DISCLOSURE OF THE INVENTION

Prior art electrical box structure is replaced by modular gangable box configurations that permit lateral ganging of boxes for increased service by mounting and support features permitting expansion and installation of additional ganged boxes from the open front of the box with removal of only that portion of the wall necessary to insert the new gangs from the wall side. The gangs are anchored in place to the original gang, without removal, by access from the wall side without necessity of removal of any wall surrounding the box.

The original boxes, anchorable on a stud or the like, thus have a removable side plate opposite to the stud, secured in place by fittings accessible from the open box front with the decorative cover plate removed. This permits the boxes to stay intact as originally wired, and further permits one or more laterally extending gangs to be fitted in place of the removed side plate. The new gangs are supported by attachment to the anchor box with screws or the like, and are inserted simply by horizontal movement through a wall opening just large enough to pass the ganged box so that no disfigurement and repair is necessary.

BRIEF DESCRIPTION OF THE DRAWINGS

In the accompanying drawings, like reference characters refer to similar features throughout the several views to facilitate comparison, and.

THE PREFERRED EMBODIMENT

Figure 1:
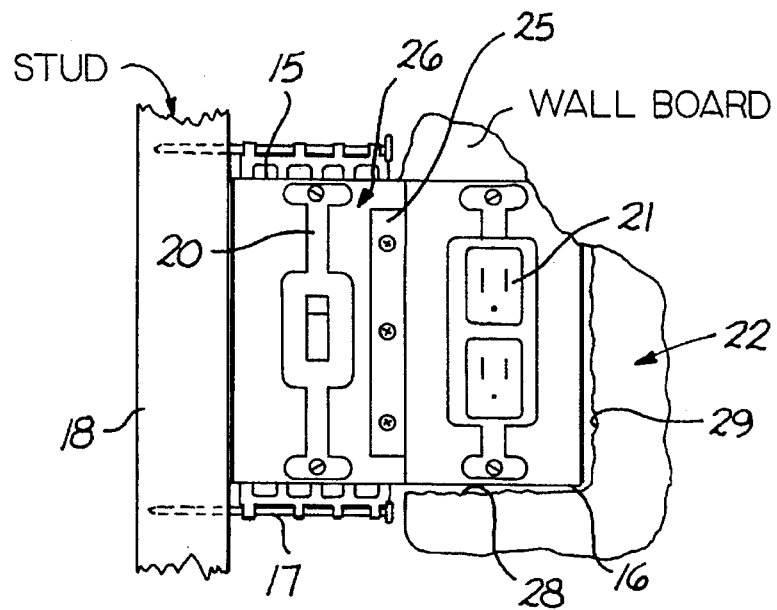
FIG. 1 is a front view sketch, partly broken away, of a two gang electrical box installation.

As seen from FIG. 1, two electrical boxes 15, 16 are gang mounted laterally side-by-side. The anchor box 15 has nails 17 driven into stud 18 for anchoring the ganged assembly in place. Switches 20, plugs 21 or other accessories may be wired in the boxes and held in place with the open fronts of the otherwise closed back boxes positioned flush with the front surface of the wall 22. Ganged box 16 is supported on and by the anchor box 15 by means of a screw-mount panel 25 extension tab on box 16 affixed to the rear closed panel 26 of the anchor box 15. This mounting structure requires access only from the front of box 15, without removal of the box 15. Thus, the wall board need only be removed at borders 28, 29, and not otherwise disfigured for fitting the ganged box 16 into place. Only box 16 supplying additional service need be wired.

Contrast that simple, low labor, low cost, non-disfiguring installation made possible by improved box structure with the conventional manner of extending electrical service by installing one or more laterally ganged boxes. As may be seen from the nails 17, to remove the previously installed anchor box 15, the wallboard 22 would have to be disfigured enough to permit a tool to remove nails 17 and box 15 and to replace it with a ganged box. Clearly the invention has avoided disfiguring of the wall and has simplified the method of extending electrical service by ganging boxes to eliminate the formerly required steps of disfiguring and restoring the wall about the installation, and of replacing and rewiring an originally anchored box.

Figure 2:
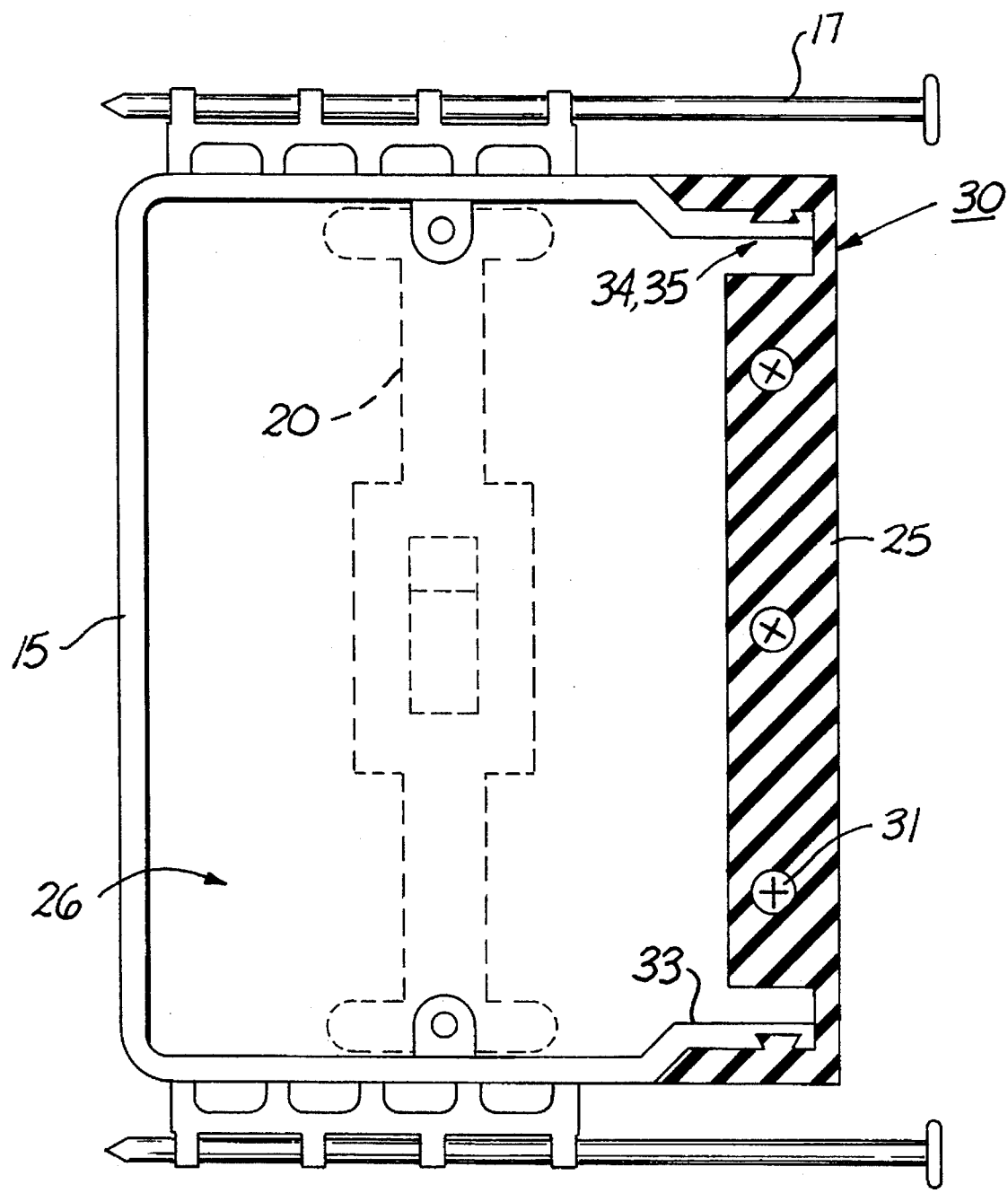
FIG. 2 is a front view of an anchor box configuration provided by the invention.

In FIG. 2, the preferred anchor box embodiment is shown in more detail. The hatching represents a cross section through replaceable end plate 30 in a plane parallel to and adjacent to the rear wall 26 of the anchor box 15. The panel 25 has three screws 31 for firmly affixing the end plate 30 to the box 15 for support. The interconnection with the anchor box 15 and the end plate 30 or further laterally ganged boxes is further strengthened by the flanged ends 33 of the anchor box and the mated ribs 34 and channels 35 respectively on the end plate 30 and the flanged ends 33. Similar interconnecting structure is provided for ganged on boxes. The ribs 34 and grooves 36 thus provide in accordance with this invention structure for mounting and supporting attachments to the anchor box 15 from the open-front access position without requiring any side access that is required in prior art systems and methods.

Figure 3:
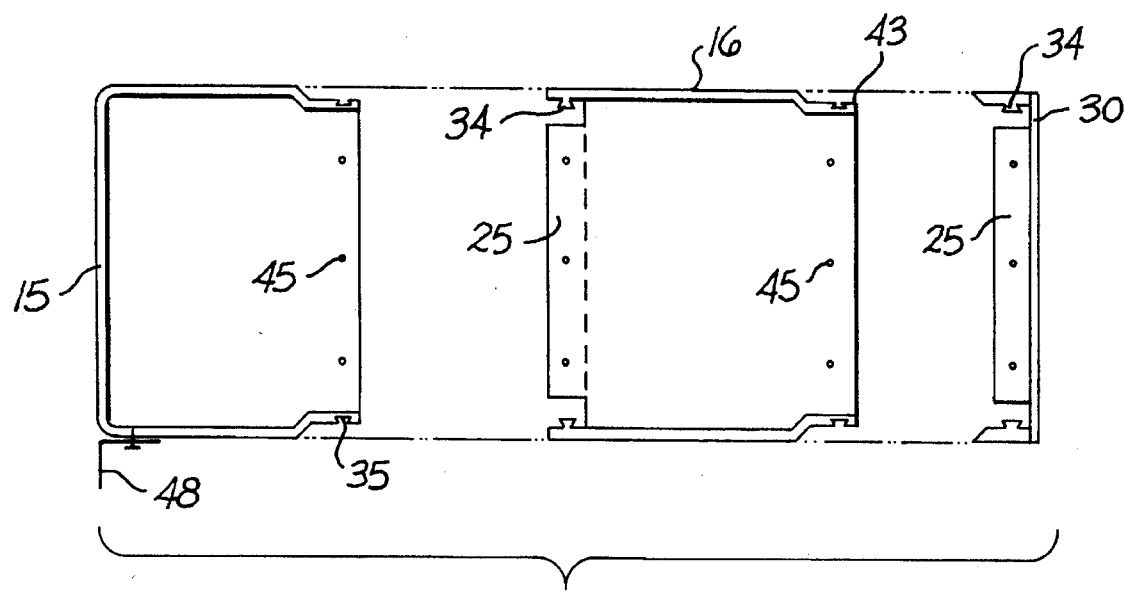
FIG. 3 is an exploded view sketch front view of a multiple gang electrical box assembly afforded by the invention.

In FIG. 3 the exploded view illustrates the structure of the ganging boxes 16 with the ability to mount and support further ganging boxes from the front without wall disfiguration. Thus the right end flanging 43 and screw access holes 45 are similar to those of anchor box which fits with either an end plate 30 or a ganged box 16. No anchor box anchoring attachments 48 are necessary for anchoring the ganging boxes in place since the interconnecting structure provides the necessary mounting and support functions for all added gangable boxes.

The improved box ganging structure therefore affords the savings of time, labor and inconvenience in the retrofitting of ganged boxes to an already installed anchor box by the simplified steps of cutting out only enough wall to receive one or more ganging boxes and mounting the ganging boxes from front openings while the anchored box remains in place without removal or rewiring.

It is evident therefore that this invention has improved the state of the art by provision of improved gangable electrical boxes and an efficient retrofit method of ganging-on additional laterally extending boxes. Those features of novelty representative of the spirit and nature of the invention are therefore set forth with particularity in the following claims.

I claim:

1. A wall mountable electrical wiring system with closed back-open front modular electrical boxes enclosed by sidewalls and adapted for receiving receptacles, switches and accessories, said boxes being modularly extendable laterally for added service, comprising in combination:

an anchor box module provided with anchoring means for affixing the anchor box module to a stud adjacent one sidewall of the box module, a removable sidewall on the anchor box module remote from the sidewall adjacent the stud, interconnection means for inserting a modular box extension between the anchor box module and the removable sidewall including support means for affixing the modular box extension firmly to the anchor box module for support, and attachment means accessible from the open front of the box module for securing the removable sidewall, removing the removable sidewall, and for replacing the removable sidewall with a modular extension box having a closed back and upper and lower sidewalls while the anchor box module is affixed to said stud wherein the support means further comprises interlocking framework between the anchor box module and the removable sidewall comprising channels extending from the front towards the back of the box module to permit removal and replacement of modules and sidewalls by movement perpendicular to the closed back.

* * * * *

(12) REEXAMINATION CERTIFICATE (4397th)
United States Patent
Simmons

(10) Number: US 5,574,255 C1
(45) Certificate Issued: Jul. 10, 2001

(54) LATERALLY EXPANDABLE MODULAR ELECTRICAL BOX

(75) Inventor: Michael L. Simmons, Lorton, VA (US)

(73) Assignee: Jeffrey S. Houk, Manassas, VA (US); a part interest

Reexamination Request:
No. 90/005,451, Aug. 16, 1999

Reexamination Certificate for:
Patent No.: 5,574,255
Issued: Nov. 12, 1996
Appl. No.: 08/075,724
Filed: Jun. 14, 1993

(51) Int. Cl.⁷ .................................................... H02G 3/08
(52) U.S. Cl. ........................................... 174/53; 220/3.92

(56) References Cited

U.S. PATENT DOCUMENTS

| | | | |
|---|---|---|---|
| 1,066,215 | * | 7/1913 | Murray . |
| 1,104,930 | * | 7/1914 | Raquette . |
| 1,112,426 | * | 9/1914 | Stoddard . |
| 1,133,946 | * | 3/1915 | Farrell . |
| 1,167,879 | * | 1/1916 | Bayliss et al. . |
| 1,201,003 | * | 10/1916 | Van Duzer . |
| 1,249,313 | * | 12/1917 | Boyton et al. . |
| 1,456,385 | * | 5/1923 | Kvarnstrom . |
| 1,817,307 | * | 8/1931 | Haase et al. . |
| 2,552,400 | * | 5/1951 | Brunia ...................................... 220/4 |

* cited by examiner

*Primary Examiner*—Dean A. Reichard

(57) ABSTRACT

There is no prior way to retrofit one or more laterally extending electrical boxes for extra switches, outlets or accessories such as rheostatic controls in existing walls without tearing out a portion of the wall, removing the box, rewiring a new ganged box and refinishing the wall. This invention provides modular lateral box extensions constructed to be installed from the open front end and supported by the installed box anchored to a beam with the wall being cut only enough to receive the extension modular box. This efficiently requires the wiring of only additional modules and avoids repair and repainting of walls.

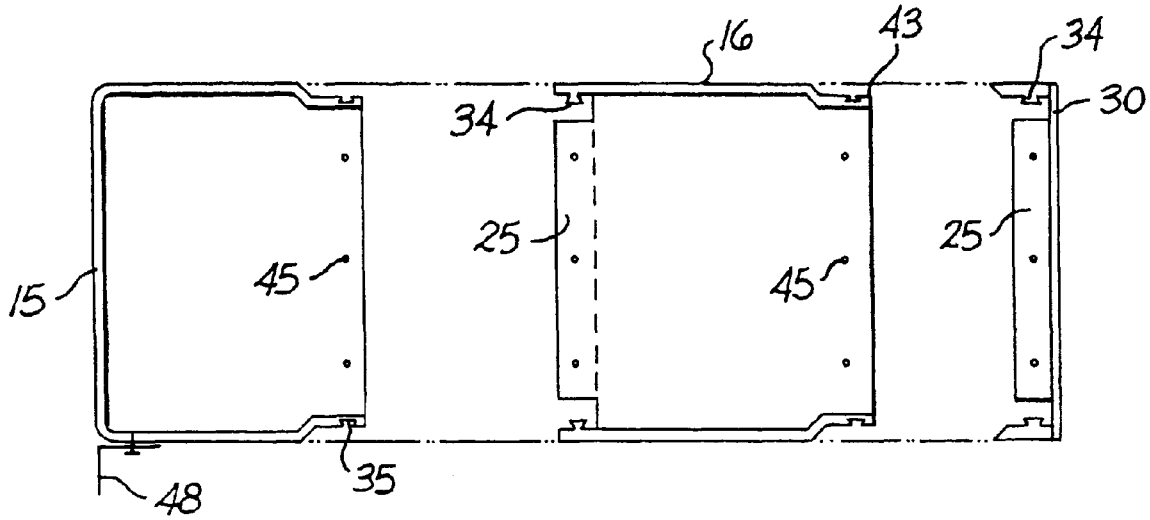

US 5,574,255 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

New claims 2–5 are added and determined to be patentable.

1. A wall mountable electrical wiring system with closed back-open front modular electrical boxes enclosed by sidewalls and adapted for receiving receptacles, switches and accessories, said boxes being modularly extendable laterally for added service, comprising in combination: an anchor box module provided with anchoring means for affixing the anchor box module to a stud adjacent one sidewall of the anchor box module, a removable sidewall on the anchor box module remote from the sidewall adjacent the stud *such removable sidewall presenting a substantially flat outer surface free of projections*, interconnection means for inserting a modular box extension between the anchor box module and the removable sidewall including support means for affixing the modular box extension firmly to the anchor box module for support, and attachment means accessible from the open front of the *anchor* box module for securing the removable sidewall, removing the removable sidewall, and for replacing the removable sidewall with a modular extension box having a closed back and upper and lower sidewalls while the anchor box module is affixed to said stud wherein the support means further comprises interlocking framework between the anchor box module and the removable sidewall comprising channels extending from the front towards the back of the *anchor* box module to permit removal and replacement of modules and sidewalls by movement perpendicular to the closed back, *whereby said removable sidewall may be removed and a ganged box inserted through a mounting wall cutout just large enough to pass the ganged box and an associated said removable sidewall*.

2. *The electrical wiring system defined in claim 1 wherein said interlocking framework further comprises: ribs disposed on said removable sidewall extending in mating contact with said channels continuously from said open front to said closed back of said modular electrical boxes.*

3. *A wall mountable electrical wiring system with closed back-open front modular electrical boxes enclosed by sidewalls and adapted for receiving receptacles, switches and accessories, said boxes being modularly extendable laterally for added service, comprising in combination: an anchor box module provided with anchoring means for affixing the anchor box module to a stud adjacent one sidewall of the anchor box module, a removable sidewall on the anchor box module remote from the sidewall adjacent the stud such removable sidewall presenting a substantially flat outer surface, interconnection means for inserting a modular box extension between the anchor box module and the removable sidewall including support means for affixing the modular box extension firmly to the anchor box module for support, and attachment means accessible from the open front of the anchor box module for securing the removable sidewall, removing the removable sidewall, and for replacing the removable sidewall with a modular extension box having a closed back and upper and lower sidewalls while the anchor box module is affixed to said stud wherein the support means further comprises interlocking framework between the anchor box module and the removable sidewall comprising channels extending from the front towards the back of the anchor box module to permit removal and replacement of modules and sidewalls by movement perpendicular to the closed back, whereby said removable sidewall may be removed and a ganged box inserted through a mounting wall cutout just large enough to pass the ganged box and an associated said removable sidewall, and wherein said removable sidewall further comprises: a screw mount panel extension tab on said sidewall having at least one mounting screw extending through the tab directed inwardly into said anchor box module to affix the sidewall to said closed back of said anchor box module.*

4. *A wall mountable electrical wiring system with closed back-open front modular electrical boxes enclosed by sidewalls and adapted for receiving receptacles, switches and accessories, said boxes being modularly extendable laterally for added service, comprising in combination: an anchor box module provided with anchoring means for affixing the anchor box module to a stud adjacent one sidewall of the anchor box module, a removable sidewall on the anchor box module remote from the sidewall adjacent the stud such removable sidewall presenting a substantially flat outer surface, interconnection means for inserting a modular box extension between the anchor box module and the removable sidewall including support means for affixing the modular box extension firmly to the anchor box module for support, and attachment means accessible from the open front of the anchor box module for securing the removable sidewall, removing the removable sidewall, and for replacing the removable sidewall with a modular extension box having a closed back and upper and lower sidewalls while the anchor box module is affixed to said stud wherein the support means further comprises interlocking framework between the anchor box module and the removable sidewall comprising channels extending from the front towards the back of the anchor box module to permit removal and replacement of modules and sidewalls by movement perpendicular to the closed back, whereby said removable sidewall may be removed and a ganged box inserted through a mounting wall cutout just large enough to pass the ganged box and an associated said removable sidewall, and wherein said anchor box module is ganged to at least one extension box module in a ganged array, wherein the extension box module is devoid of external anchoring means for attachment of the extension box module directly to a building structural member.*

5. *The electrical wiring system defined in claim 1 wherein said support means for affixing a modular box extension firmly to the anchor box module for support further comprises: offset inwardly flanged open ends on the anchor box module comprising said interlocking framework between the anchor box module and the removable sidewall, and mating interlocking structure on said removable sidewall nested into said inwardly flanged open ends of the anchor box module.*

\* \* \* \* \*